United States Patent [19]
Shimoda et al.

[11] Patent Number: 5,560,592
[45] Date of Patent: Oct. 1, 1996

[54] HYDRAULIC DAMPING DEVICE

[75] Inventors: Yoshiki Shimoda; Kyoichi Fujinami; Norihiro Yamada, all of Aichi-ken, Japan

[73] Assignee: Toyoda Gosei Co., Ltd., Japan

[21] Appl. No.: 495,995

[22] Filed: Jun. 28, 1995

[30] Foreign Application Priority Data

Jun. 28, 1994 [JP] Japan .................................. 6-170124

[51] Int. Cl.$^6$ .............................. F16M 5/00; F16F 13/00; B60K 5/12
[52] U.S. Cl. ....................................... 267/140.13; 267/219
[58] Field of Search .......................... 267/140.11–140.15, 267/219, 220, 35; 180/300, 312, 902, 291; 248/562, 636

[56] References Cited

U.S. PATENT DOCUMENTS

| 4,607,828 | 8/1986 | Bodin et al. . | |
|---|---|---|---|
| 5,018,699 | 5/1991 | Bretaudeau et al. . | |
| 5,167,403 | 12/1992 | Muramatsu et al. | 267/140.13 |
| 5,178,374 | 1/1993 | Maeno . | |
| 5,209,460 | 5/1993 | Bouhours et al. | 267/140.13 |

FOREIGN PATENT DOCUMENTS 61-197833 9/1986 Japan .
62-127536 6/1987 Japan .

*Primary Examiner*—Douglas C. Butler
*Attorney, Agent, or Firm*—Cushman Darby & Cushman, L.L.P.

[57] ABSTRACT

A hydraulic damping device including a main damping body protected by a cylindrical portion with downwardly extending side walls. The damping device includes a flexible membrane which has a step portion, a main liquid chamber, an auxiliary liquid chamber and a partition formed in a cup-shape. A passage is made between the step portion of the flexible membrane and the interior of the partition. The partition divides the liquid chamber into a main liquid chamber and an auxiliary liquid chamber. The partition also includes a hole formed therein, a channel and a concave recess formed on the partition side wall between the hole and the channel. This structure permits the main liquid chamber to be connected to the auxiliary liquid chamber through the hole, the passage and the channel. The membrane is inserted into the interior of a cylindrical portion of the main damping body together with the partition and the damping liquid to define a simply constructed sub-assembly. This sub-assembly is subsequently easily inserted into the interior of a cylindrical portion of the supporting member by pressurized insertion.

6 Claims, 4 Drawing Sheets

HYDRAULIC DAMPING DEVICE

BACKGROUND OF THE INVENTION

1. Field of the Invention

The present invention relates to a hydraulic damping device for vehicles. It is particularly suitable for an insertion between two rigid structures, such as a vehicle chassis and an engine as an engine mounting, for the purposes of damping and supporting such structures.

2. Description of Related Art

A conventional hydraulic damping device for a vehicle is shown in FIG. 1.

A similar conventional device is disclosed in the U.S. Pat. No. 4,607,828.

As shown in FIG. 1, a hydraulic damping device 10 has a main damping body 1, a flexible membrane 2, a main liquid chamber A, an auxiliary liquid chamber B, a partition 3, a passage 4, a metal side wall 5, on upper-side supporting member 7 and a lower-side supporting member 6.

The main damping body 1 is formed with a frustoconic shape from a thick rubber wall, and defines an interior liquid chamber extending across the bottom half of the device. The upper-side supporting member 7 is provided with a bolt 8, which is connected to one of the rigid structures, such as engine not shown. Also, the main damping body 1 is connected to the tubular metal side wall 5, at lower and outer peripheral portions thereof by vulcanization. The upper-side supporting member 7 is also fixed to the main damping body 1 by vulcanization.

The flexible membrane 2 is made of a thin rubber sheet, such as bellows or diaphragm, and closes a lower opening of the main damping body 1 for providing the liquid chamber between them.

The partition 3 is provided in the liquid chamber and divides the liquid chamber into a main liquid chamber A and an auxiliary liquid chamber B. Also, the partition 3 has an annular passage 4 which is formed about an outer peripheral portion and cooperates with an inner surface of the main damping body 1.

The passage 4 has two holes 11, 12 which open into the main liquid chamber A and the auxiliary liquid chamber B, respectively. Therefore, the main liquid chamber A leads to the auxiliary liquid chamber B through the passage 4.

The metal side wall 5 has an annular U-shaped portion 15 at a lower portion. This portion provides a connection for the metal side wall 5 to the lower-side supporting member 6, partition 3 and the flexible membrane 2 at the annular U-shaped portion 15 by clamping.

The lower-side supporting member 6, which is formed to a dish shape, has a bolt 13 at the center portion for connecting to the other of rigid structures, such as vehicle chassis not shown.

The hydraulic damping device 10 is assembled by clamping elements together at the annular U-shape portion 15, and the device 10 has two deformable chambers filled with a damping liquid, separated by the partition 3.

When the device 10 is vibrated during vehicle use, the main damping body 1 is deformed. As such deformation occurs, the filled damping liquid flows from the main liquid chamber A to the auxiliary liquid chamber B through the passage 4 and the respective openings 11 and 12. Vibration is absorbed by the deformation of the main damping body 1 and the flowing of the filled damping liquid through the throttled passage 4.

However, in above conventional device 10, the passage 4 is formed from one plate, such a partition 3, to make the U-shaped outer peripheral portion in the cross-section. Formation of the passage 4 is not easy to achieve on partition 3. For that reason, various devices have been proposed to make formation of the passage 4 on the partition 3, more easily accomplished, for example, Japanese Patent Laid-open publication No. Sho 61-197833 and Japanese Patent Laid-open publication No. Sho 62-127536. These references disclose different modifications of a partition wall to improve forming. For example, the partition is constructed from two plate members which overlap to form the passage, or the passage is made from one plate by drawing or squeezing the plate.

The two piece partition necessarily increases the number of parts and requires many additional manufacturing steps. Where plates are drawn formation of the partition requires complicated shapes, and involves many additional manufacturing steps, more time and additional cost.

Further, the above conventional hydraulic damping device 10 has a large diameter to produce the desired sealing between both liquid chambers A, B and the outside of the liquid chamber at the clamping portion where the annular U-shaped portion 15 of side wall 5 is connected to membrane 2, partition 3 and the supporting member 6. This large diameter makes the device 10 bigger so that extra space is taken up in an otherwise small engine compartment.

SUMMARY OF THE INVENTION

The present invention overcomes the conventional hydraulic damping device problems described above.

An object of the present invention is to provide a hydraulic damping device, wherein the construction of the device is simple, and the manufacturing and assembling of the device are easy.

Another object of the present invention is to provide a hydraulic damping device which reduces the size of the device.

Yet another object of the present invention is to provide a hydraulic damping device which assures position sealing between an internal liquid chamber and the outside of the device.

In accordance with the invention, these objects are achieved by a hydraulic damping device for vehicles that has a main damping body which has a cylindrical portion and a metal side wall. The device also includes a flexible membrane which has a stepped portion, a main liquid chamber, an auxiliary liquid chamber, a partition which is formed with a cup-shape and a passage made between the stepped portion of the flexible membrane and the partition. The device also includes supports including a lower-side supporting member which has a cylindrical portion. The partition divides the liquid chamber into a main liquid chamber and on auxiliary liquid chamber. Also, the partition includes a hole formed on an upper wall, and a through-way or channel is likewise formed on the upper wall so as to protrude upwardly to define a space. The partition also includes an inwardly directed concave recess formed on the side wall and located between the hole and the channel.

The main liquid chamber leads to the auxiliary liquid chamber through the hole, the passage and the channel. The membrane is inserted into the interior of the cylindrical portion of the main damping body with the partition and the damping liquid for making sub-assembly. Then, this subassembly is inserted into an interior of the cylindrical portion of the lower-side supporting member by pressurized insertion. Therefore, the construction of the hydraulic damping device is simple, and the manufacturing and assembling of the device are easy. Further, it is preferable to squeeze around the cylindrical portion. Consequently, the cylindrical portion of the lower-side supporting member is certainly contacted with the cylindrical portion of the main damping body, and this structure provides sufficient sealing of the liquid chamber.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

Preferred exemplary embodiment of the present invention will now be described in reference to the accompanying drawings.

Figure 1:
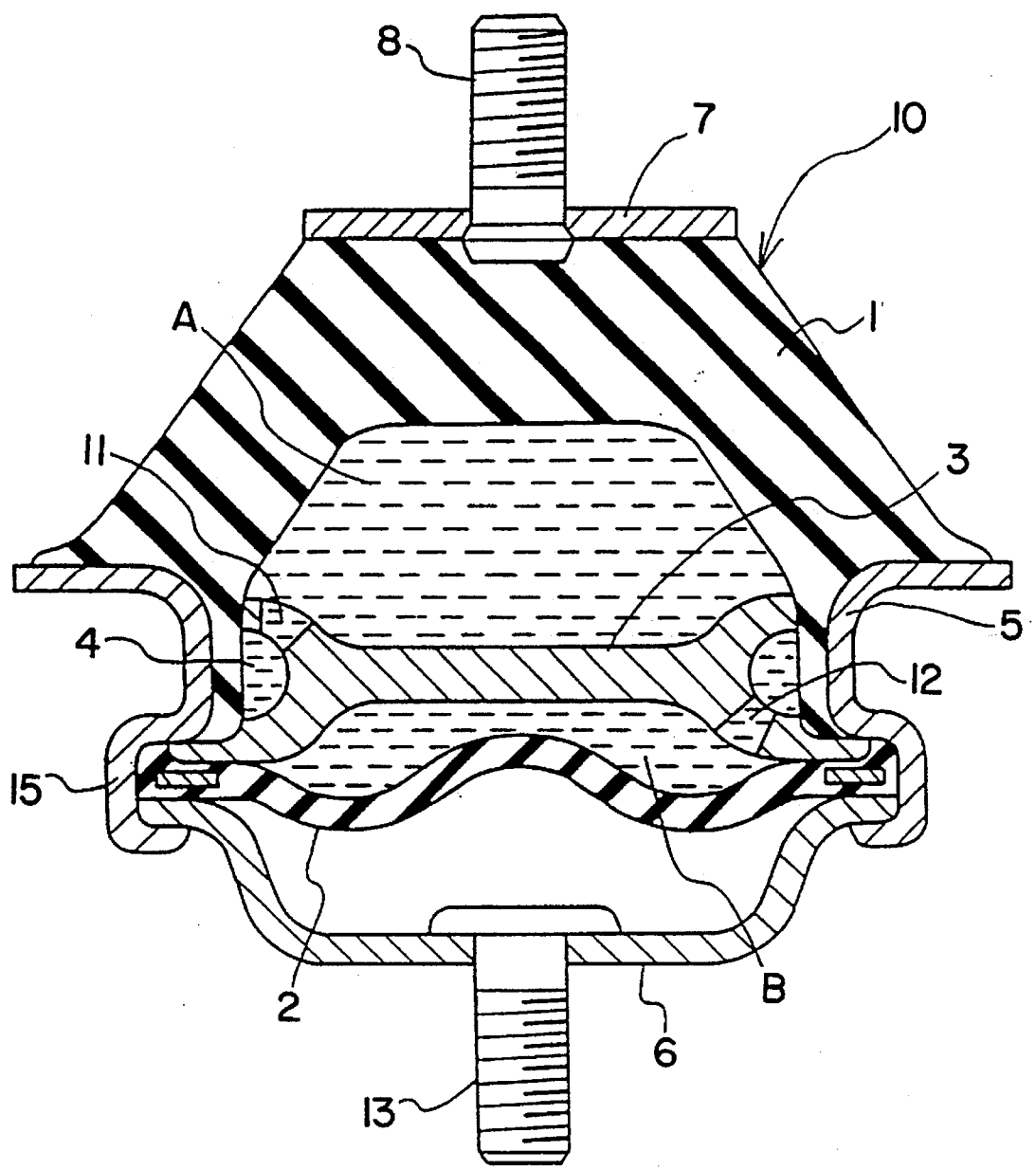
FIG. 1 is a cross-sectional view of a conventional hydraulic damping device.
Figure 2:
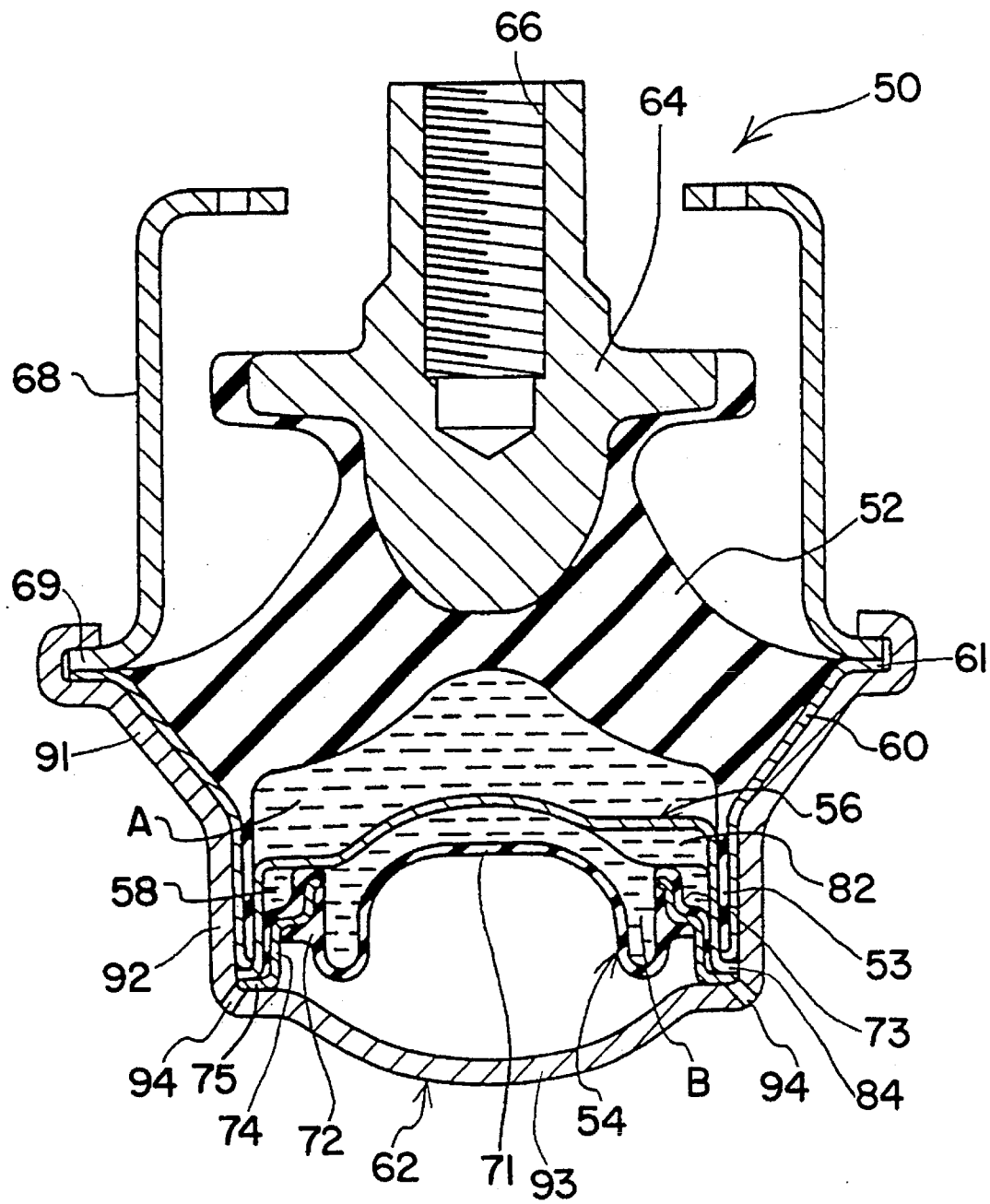
FIG. 2 is a cross-sectional view of a hydraulic damping device according to the present invention.
Figure 3:
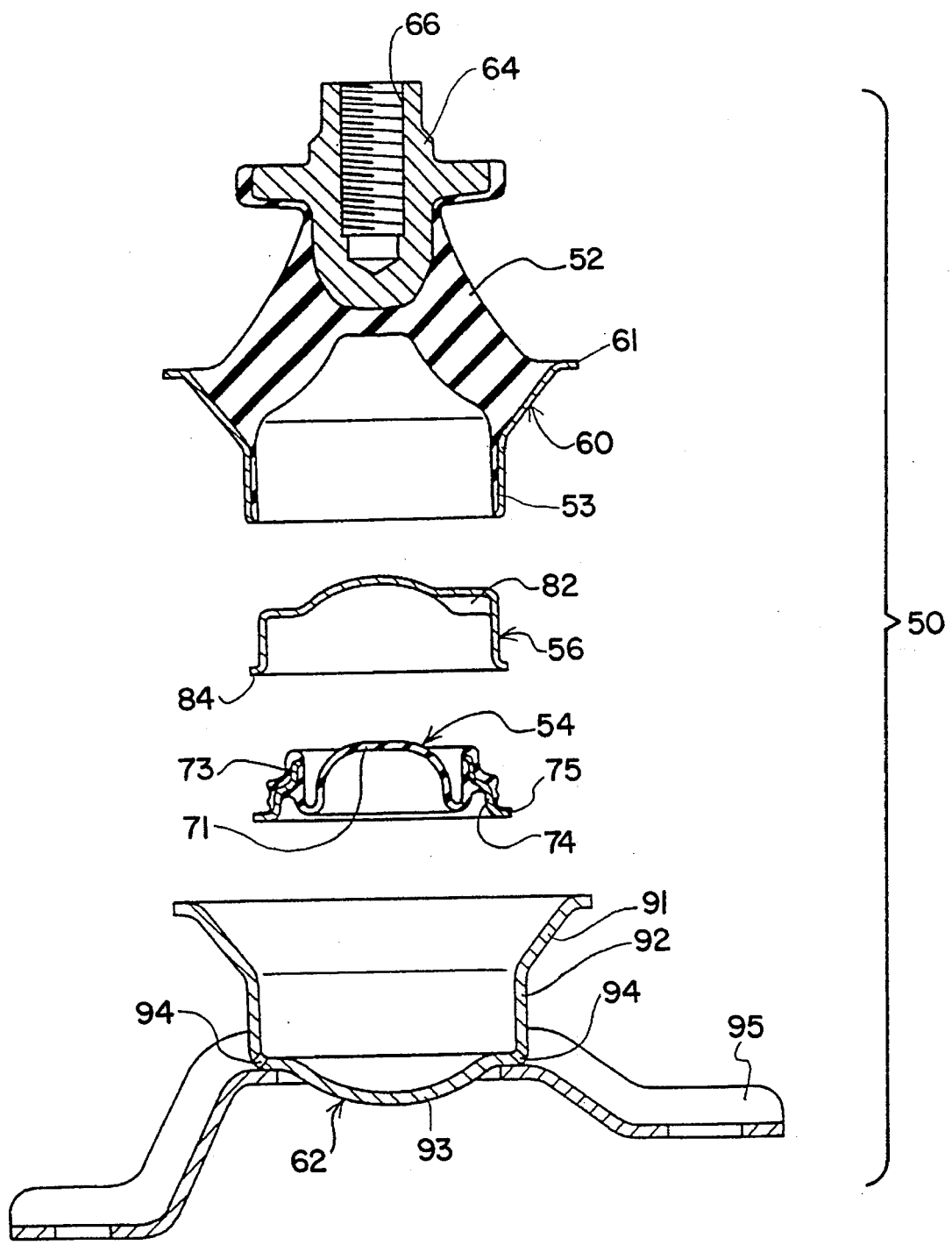
FIG. 3 is a separated cross-sectional view of the hydraulic damping device in FIG. 2.

As shown in FIGS. 2 and 3, a hydraulic damping device 50 basically has a main damping body 52, a flexible membrane 54, a main liquid chamber A, an auxiliary liquid chamber B, a partition 56, a passage 58, a metal side wall 60, and a lower-side supporting member 62.

The main damping body 52 is formed a thick and fluid-tight frustoconic wall made of rubber or similar elastic material. Further, the main damping body 52 has an upper-side supporting member 64 with a female screw 66, which can be connected to one of rigid structures, such as engine not shown, at the upper portion. The main damping body 52 is also connected to the metal side wall 60, which is formed to a funnel shape, at the lower peripheral portion by, for example, vulcanization. The main damping body 52 also includes a depending cylindrical portion 53, at is clearly shown in FIG. 3, extending downwardly from the under side together with the metal side wall 60. Also, the main damping body 52 defines an interior liquid chamber extending across the bottom half of the device. Further, the upper-side supporting member 64 is fixed by adhesion of vulcanization.

The main damping body 52 and the upper-side supporting member 64 are surrounded by a metal cover member 68, which is formed with a cylindrical shape and includes a flange portion 69. The cover member 68 extends from an upper portion downwardly. The flange portion 69 of the cover member 68 connects to the lower-side supporting member 62 through a crimped portion of the metal side wall 60. The upper peripheral portion of the lower-side supporting member 62 is bent inwardly and it clamps the annular flange portion 69, as well as an annular upper flange portion 61 of the metal side wall 60. Further, while use of cover member 68 is preferable, it is not always necessary. Consequently, above clamping is not always necessary and where cover 68 is omitted the upper peripheral portion of member 62 would only be clamped to flange portion 61.

The flexible membrane 54 has a center membrane portion 71, which is made of a thin and fluid-tight rubber sheet so that it acts as a bellows or diaphragm, and it includes a thick peripheral portion 72. The peripheral thick portion 72 has an annular step portion 73, which is formed to an L-shaped cross-section on the upper and outer peripheral portion. An annular metal reinforcing insert 74 is embedded in the thick portion 72. The insert 74 is formed along to a similar shape of the step portion 73, and it has an annular flange portion 75 at the lower and outer peripheral portion for extending perpendicularly outwardly. Also, the flexible membrane 54 closes a lower opening of the main damping body 52 for providing the liquid chamber between the main damping body 52 and the flexible membrane 54.

As shown in FIGS. 2 to 5, the partition 56 is formed with a cup-shape that is inverted so as to define an opening at its lower-side. The partition 56 is provided in an interior of the liquid chamber so as to divide the liquid chamber into a main liquid chamber A and an auxiliary liquid chamber B. Therefore, the main liquid chamber A is located between the main damping body 52 and the partition 56, and the auxiliary liquid chamber B is located between the partition 56 and the flexible membrane 54.

Figure 4:
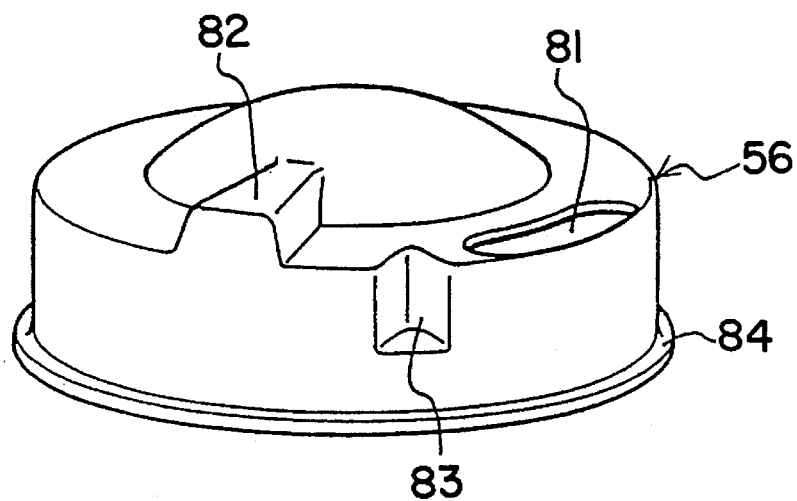
FIG. 4 is an enlarged, perspective view of the partition.
Figure 5:
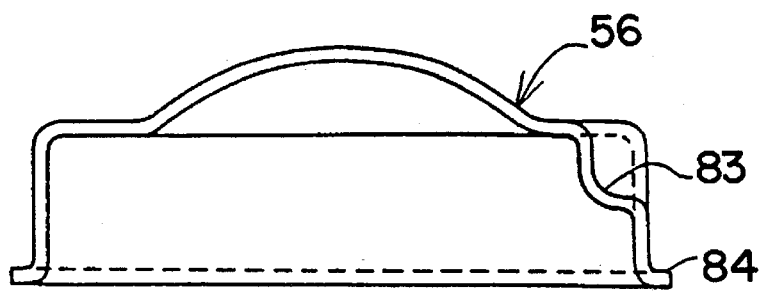
FIG. 5 is an enlarged, cross-sectional view showing the partition of FIG. 4.

As show in FIG. 4, the partition 56 includes a hole 81 formed on the upper wall, a through-way or channel 82 formed on the upper wall so that it protrudes upwardly to form a space or passage. Further, the side wall includes an inwardly directed concave recess 83 which is located between the hole 81 and the channel 82. The partition 56 also has an outwardly extending flange portion 84 which is formed at the lower and outer peripheral portion so as to mate or interfit with flange portion 75 of the flexible membrane 54.

The passage 58 is created between the interior portion of the upper and side walls of partition 56 and the step portion 73 formed in flexible membrane 54. When the hydraulic damping device 50 is assembled, membrane 54 is inserted into the interior of the partition 56 together with a damping liquid. At that time, the upper and side edges of the step portion 73 are positively contacted with the upper and side walls of the partition 56, so that the passage 58 is defined between them. Further, the concave recess 83 of the partition 56 is in contact with the side and bottom walls of the step portion 73 so that the passage 58 is closed by the inwardly directed recess at this portion in the circumferential direction.

However, the upper edge of the step portion 73 is not in contact with the interior of the upper wall of the partition 56 at the channel 82, so that the damping liquid can move in the circumferential direction, and into the auxiliary liquid chamber B through the channel 82. Also, hole 81 provided in partition 56 constitutes an opening into passage 58 from the main liquid chamber A. Therefore, the main liquid chamber A is connected to the auxiliary liquid chamber B through hole 81, the passage 58 and channel 82. Also, when the hydraulic damping device 50 is assembled, the flange portion 84 of the partition 56 and the flange portion 75 of the flexible membrane 54 are laid together so that there is an overlap therebetween. The lower edge of the cylindrical portion 53 of the main damping body 52 will contact the upper surface of the flange portion 84. Therefore, that structure provides an initial sealing of the liquid chamber relative to the outside thereof because of the face-to-face contact between circumferential vertical side walls of the partition 56 and the membrane 54 on the inside and with portion 53 on the outside of such side walls.

Further, each outer diameter of flange portions 75, 84 is formed to the same diameter as the outer diameter of the cylindrical portion 53 of the main damping body 52.

The lower-side supporting member 62 is formed to have a funnel shaped side wall cylindrical portion 92 similar to the metal side wall 60 and a bottom wall 93, so that it has a frustoconic portion 91. The lower-side supporting member 62 also has air-release holes 94 adjacent the outer edges of the bottom wall 93. They are preferably located at the corner between the cylindrical portion 92 and the bottom wall 93. As shown in FIG. 2, air-release holes 94 become closed when the assembling of the device 50 is finished. A connecting plate 95, which is adapted to the lower supporting member 62, has holes for connecting to the other of rigid structures, such as vehicle chassis not shown. (See in FIG. 3.)

The hydraulic damping device 50 is assembled as noted above, with the damping liquid, and the cylindrical portion 53 of a sub-assembly is inserted into the cylindrical portion 92 of the lower-side supporting member 62 by pressurized insertion. When completed, the device 50 has two deformable chambers A and B filled with the damping liquid, separated by the partition 56. At first, the membrane 54 is inserted into the interior of the cylindrical portion 53 of the main damping body 52 with the partition 56 and the damping liquid for making the sub-assembly. Then, the cylindrical portion 53 of this sub-assembly is inserted into the interior of the cylindrical portion 92 of the lower-side supporting member 62 by pressurized insertion. At that time, since each outer diameter of the flange portions 75, 84 has the same diameter as the outer diameter of the cylindrical portion 53, the insertion can be smooth or easily accomplished. Then, both flange portions 75 and 84 are sandwiched between the lower edge of the cylindrical portion 53 and the bottom wall 93 of the lower-side supporting member 62. It is preferable to also squeeze around the cylindrical portion 92. Consequently, the cylindrical portion 92 is positively in contact with the cylindrical portion 53, and this structure provides sufficient sealing of the liquid chamber and the exterior of the device.

Before the sub-assembly is inserted into the cylindrical portion 92, it is preferable to squeeze around the cylindrical portion 53.

Also, since the lower-side supporting member 62 has air-release holes 94 on the bottom wall 93, any air inside of the cylindrical portion 92 will be released through air-release holes 94 during the sub-assembly insertion. Air-release holes 94 thus prevent any increase in interior pressure within the cylindrical portion 92.

This aids in making the pressurized insertion easy to accomplish. Further, it is preferable to close air-release holes 94 by the flange portion 84 or 75 when the assembling of the device 50 is finished. However, such closing of air-release holes 92 is not always necessary, so that if it is not desirable to close air-release holes 92, they should be located away from where the flange portion 84 or 75 will not contact them.

When the vibration occurs relative to this device 50 during vehicle operation, the main damping body 52 is deformed, and then, the filled damping liquid flows from the main liquid chamber A to the auxiliary liquid chamber B through the opening 50, passage 58 and channel 82. As liquid resonance occurs, the vibration is absorbed.

Further, according to above embodiment, the passage 58 includes the combination of the L-shaped step portion 73 of the membrane 54 and the interior upper and side walls of the cup-shaped partition 56. Therefore, formation of the passage does not increase the number of parts, and it is easy to make it. Especially, in general, it is easy to make the flange 84, which only extends perpendicularly outwardly, by press forming. This forming of the outer edge of the flange portion 84 of the partition 56 is carried out by the cutting in the vertical direction. Thus, press forming the partition 56 will simultaneously result in the formation of flange portion 84. Therefore, additional forming steps are required, for example, cutting in the horizontal direction. Consequently, the partition 56 can be made in a continuous order of steps, and that reduces the number of steps. This also reduces manufacturing costs.

Also, according to above embodiment, the membrane 54 is inserted into the interior of the cylindrical portion 53 of the main damping body 52 with the partition 56 and the damping liquid for making the sub-assembly. Then, the cylindrical portion 53 of this sub-assembly is inserted into the interior of the cylindrical portion 92 of the lower-side supporting member 62 by pressurized insertion. At that time, since each outer diameter of the flange portions 75, 84 is made to be the same as the outer diameter of the cylindrical portion 53, assembly will be easy. Then, both flange portions 75 and 84 are sandwiched between the lower edge of the cylindrical portion 53 and the bottom wall 93 of the lower-side supporting member 62. Therefore, an inner surface of the cylindrical portion 92 is positively in contact with the outer surface of the cylindrical portion 53 thereby sealing the liquid chamber from the outside.

Further, since air-release holes 94 prevent any increase in interior pressure within cylindrical portion 92, this also makes pressurized insertion proceed smoothly. And, since air-release holes 94 are located at the corner between the bottom wall 93 and cylindrical portion 92, air-release holes 94 are closed when the assembling of the sub-assembly is finished, this also reduces the number of manufacturing steps. And there is no need the large diameter for clamping, so that, the hydraulic damping device 50 can be reduced the size of the device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hydraulic damping device for vehicles comprising:

a main damping body;

a metal side wall connected at a lower peripheral portion of said main damping body;

a depending cylindrical portion comprised of said main damping body and said metal side wall;

a liquid chamber being defined within said main damping body;

a flexible membrane positioned within said cylindrical portion and having a center membrane portion and a thickened peripheral portion;

said flexible membrane having an annular step portion formed on an upper and outer peripheral portion of said thickened portion;

a cup-shaped partition having an open lower-side, said partition being provided in the interior of said liquid chamber between said main damping body and said flexible membrane for dividing said liquid chamber into a main liquid chamber and an auxiliary liquid chamber;

said partition including a hole formed on an upper wall, a through-channel formed on said upper wall at a location spaced from said hole, said through-channel for protruding upwardly in said upper wall, and a concave recess formed on a depending side wall of said partition and located between said hole and said through-channel; and a support member having a cortically shaped portion and a cylindrical portion;

said flexible membrane being inserted into an interior of said partition together with a damping liquid to bring the upper and side edges of said step portion into contact with said upper and side walls of said partition, respectively, defining a passage therebetween, and said main liquid chamber being led to said auxiliary liquid chamber through said hole, said passage and said through-channel.

2. A hydraulic damping device as set forth in claim 1, wherein said main damping body further includes a supporting member for connecting said device to a vehicle.

3. A hydraulic damping device as set forth in claim 1, wherein said support member includes means defining at least one air-release hole on a bottom wall thereof for releasing the air inside said cylindrical portion during assembly.

4. A hydraulic damping device for vehicles comprising:

a main damping body including a thickened and fluid-tight frustoconical upper wall comprised of elastic material;

a metal side wall, extending about an exterior of surface of said upper wall of said main damping body peripheral portion of said main damping body;

said main damping body and said metal side wall further including a depending cylindrical portion;

a liquid chamber defined within said main damping body;

a flexible membrane having a center membrane portion comprised of a thin and fluid-tight rubber sheet, and a thickened peripheral portion;

said flexible membrane having an annular step portion formed on an upper and outer peripheral portion of said thickened portion, said flexible membrane further including a peripherally located insert member having a flange portion formed at a lower and outer peripheral portion thereof;

a partition being formed to a cup-shape having an open lower-side, said partition being provided in the interior of said liquid chamber between said main damping body and said flexible membrane for dividing said liquid chamber into a main liquid chamber and an auxiliary liquid chamber;

said partition including a hole formed on an upper wall, a through-channel formed on said upper wall at a location spaced from said hole, said through-channel protruding upwardly in said upper wall, a concave recess formed on a depending side wall of said partition and located between said hole and said through-channel, and a flange portion formed at a lower and outer peripheral portion and extending perpendicularly outwardly therefrom;

a passage being made between said upper and side walls of said partition and said step portion of said flexible membrane; and a support member having a conically shaped portion and a cylindrical portion;

said flexible membrane being inserted into an interior of said partition together with a damping liquid, to bring upper and side edges of said step portion of said membrane into contact with said upper and side walls of said partition, respectively, thereby defining a passage therebetween, and said main liquid chamber being led to said auxiliary liquid chamber through said hole, said passage and said through-channel, said cylindrical portion of said main damping body being inserted into said cylindrical portion of said support member so that said portion flange portion and said insert flange portion are sandwiched between a lower edge of said cylindrical portion and a bottom wall of said support member.

5. A hydraulic damping device as set forth in claim 4, wherein said main damping body has an upper-side supporting member for connecting to one of rigid structures.

6. A hydraulic damping device as set forth in claim 4, wherein said the lower-side supporting member has an air-release hole on a bottom wall for releasing the air inside of a cylindrical portion when said cylindrical portion of said main body inserts into said cylindrical portion of said lower-side supporting member by the pressurized insertion.

* * * * *